US006410123B1

(12) United States Patent
Otani et al.

(10) Patent No.: US 6,410,123 B1
(45) Date of Patent: Jun. 25, 2002

(54) INK JET RECORDING PAPER AND THE PRODUCTION THEREOF

(75) Inventors: Teiichi Otani; Atsushi Ono; Yoshifumi Iimori; Akinobu Chatani; Noboru Kondo; Takashi Ueno; Yoshihiro Kuroyama, all of Tokyo (JP)

(73) Assignee: Nippon Paper Industries Co. Ltd., Tokyo (JP)

( * ) Notice: Subject to any disclaimer, the term of this patent is extended or adjusted under 35 U.S.C. 154(b) by 0 days.

(21) Appl. No.: 09/472,729

(22) Filed: Dec. 27, 1999

(51) Int. Cl.[7] ................................................. B41M 5/00
(52) U.S. Cl. ...................... 428/212; 427/152; 427/214; 428/195; 428/207; 428/211; 428/331; 428/342
(58) Field of Search .................................. 428/195, 207, 428/211, 212, 331, 341, 342; 427/152, 214

(56) References Cited

FOREIGN PATENT DOCUMENTS

| JP | 57-087988 | | 6/1982 |
|---|---|---|---|
| JP | 61-146591 | | 7/1986 |
| JP | 63-222885 | | 8/1988 |
| JP | 3215080 | * | 9/1991 |
| JP | 3256785 | * | 11/1991 |
| JP | 5-051469 | | 3/1993 |
| JP | 6-092011 | | 4/1994 |
| JP | 7-032725 | | 2/1995 |
| JP | 7089220 | * | 4/1995 |
| JP | 7101142 | * | 4/1995 |
| JP | 7117335 | * | 5/1995 |
| JP | 9183265 | * | 7/1997 |

* cited by examiner

*Primary Examiner*—Bruce H. Hess
(74) *Attorney, Agent, or Firm*—Gary C. Cohn PLLC

(57) ABSTRACT

An ink jet recording paper, which is excellent in ink absorbency and color-developing properties and has dull-tone glossiness, comprising an ink-receiving layer and at least two colloidal silica layers applied successively onto a support, each of said colloidal silica layers comprising chain colloidal silica as a main ingredient, wherein at least the colloidal silica layer contacting the ink-receiving layer contains no binder and has a coverage of about 1 to 3 $g/m^2$, and the coverage of other colloidal silica layer is about 1 to 6 $g/m^2$.

17 Claims, No Drawings

INK JET RECORDING PAPER AND THE PRODUCTION THEREOF

BACKGROUND OF THE PRIOR ART

1. Technical Field

The present invention relates to ink jet recording paper and the production thereof and, more particularly, to ink jet recording paper superior in image reproducibility to such an extent that the printed paper can be used for print proofs, having a high-quality, dull-tone glossy appearance and high ink absorbency, thereby being suitable for an ink jet printer of a photo-type that usually discharges a large quantity of ink.

2. Prior Art

Ink jet recording is a method by which fine ink drops are jetted out using any kind of jetting method to form an image on a recording material. Since this method enables a recording apparatus to be operated at high speed and using generally inexpensive apparatus, the use of ink jet recording systems has been spreading rapidly. Along with this, the ink jet recording paper market has become diversified. For instance, there has been in increasing interest in preparing print proofs with an ink jet printer. Previously, these have been prepared using ink and a proof sheet.

More specifically, in the latest full-color ink jet printers, by virtue of the reduction of the ink droplets to microscopic size, the use of photo inks containing small content of dye, and etc., a printer, which can realize image qualities comparative to those of silver salt films only when a specific paper is used, has appeared in the market.

In the general art of printing, papers having different levels of glossiness are used, depending on the required appearance of the finished prints. For instance, cast coated paper (gloss type), art paper (semi-gloss type), dull-art paper (dull-tone type), coated paper, slightly coated paper, free sheet (matte type), etc. are used for various applications. Similarly, papers for use in proofreading prints must have varying levels of glossy appearance, as the printing papers do. However, conventional recording paper for use in ink jet printers is classified into either gloss types of high gloss or matte types of almost no gloss.

With regard to the conventional techniques for obtaining glossy ink jet recording papers, Japanese Tokkai Hei 7-101142/1995 (the term "Tokkai" as used herein means an "unexamined published patent application") discloses a process for obtaining an ink jet recording paper with glossiness of not less than 25% in terms of 75 degree specular one by forming a layer of colloidal particles having a diameter of not more than 300 nm on the ink-receiving layer. Japanese Tokkai Hei 9-183265/1997 discloses forming two or more of ink-receiving layers containing colloidal silica and binder on the support. Japanese Tokkai Hei 3-215080/1991, 3-256785/1991, 7-89220/1995 and 7-117335/1995 disclose forming two or more ink-receiving layers the topmost layer of which functions as a gloss-developing layer.

These conventional techniques have a general object aimed to obtain products with a considerably high level of gloss similar to that of photographs and prints printed on art coated paper or cast coated paper. For this end, a film is usually used, a casting or transferring process which easily produces high gloss is commonly employed for finishing, or the coverage of colloidal silica is generally greatly increased.

Further, the ink jet recording paper disclosed in Japanese Tokkai Hei 9-183265, which has two or more of ink-receiving layers formed on the support, each containing colloidal silica and binder, is expensive and exhibits crazing problems because the colloidal silica layer positioned near the support contains a binder and is therefore very thick.

At all cases, in order to impart a glossy appearance, it is necessary to use small particle size pigments such as colloidal particles of silica and the like together with a binder. However, the use of spherical colloidal particles causes a drawback in that the speed at which ink is absorbed is lowered because the volume of voids formed between these particles decreases when a layer of the particles is formed. Further, colloidal silica in itself has no voids of the type that synthesized amorphous silica has. Accordingly, when using colloidal silica, a thick-coated ink-receiving layer is needed in order to attain the required ink-absorptive volume. However, forming such a thick ink-receiving layer often induces a powder-detaching phenomenon. Powder detachment can be prevented by increasing the amount of binder, but then the absorbing speed decreases, especially on the surface, causing a bleeding phenomenon. As a result, high-resolution prints cannot be obtained.

On the other hand, it is known that the sheet absorbs ink faster as the volume of the voids contained in the ink-receiving layer increases, and that a large volume of ink can be absorbed when the pigment contained in the ink-receiving layer has large specific surface area. Accordingly, pigments having large specific surface area and large particle diameter of not less than several $\mu$m such as synthetic amorphous silica prepared by agglomerating small primary particles of synthetic silica are generally used. However, an ink jet recording paper containing these pigments has almost no gloss. Accordingly, it belongs to so called "matte type". Thus, using conventional processes, one cannot prepare an ink jet recording paper with a moderately glossy appearance, such as a light coated paper and a dull-tone ink jet recording paper, without calendar finishing.

Moreover, it is becoming increasingly common to bulletin or store papers with high quality recording images for a long period of time. As a result, there is an increasing need to improve the light resistance of the image. Ways and means for improving the light resistance of images formed with dye-containing ink have been proposed such as: adding a UV light-absorbing agent of benzophenone, benzotriazole and other types to an ink jet recording paper (see Japanese Tokkai Sho 57-87988/1982, 63-222885/1988); combining zinc oxide powder with cationic resinous additive (see Japanese Tokkai Hei 7-32725/1997); adding an alkyl- or acetyl-substituted, or unsubstituted hindered amine compound (see Japanese Tokkai Sho 61-146591); and etc. However, sufficient light resistance of images still has not been attained.

3. Problems Encountered

Therefore, an object of the present invention is to provide an ink jet recording paper having good ink absorbency so that bleeding is prevented, so that the paper is capable of producing prints having high color density and excellent color reproducibility, even when the paper is printed using the latest high-resolution photo quality ink jet printer. In addition, it is an object to provide an ink jet recording paper with a moderately glossy appearance, such as a light coated paper and a dull-tone ink jet recording paper without calendar finishing, which means the paper has a dull or moderately glossy appearance, wherein the paper is capable of producing print proofs and is capable of forming light-resistant image. It is further desirable to provide a process for making such a paper.

SUMMARY OF THE INVENTION

An essential feature of the present invention resides in an ink jet recording paper comprising a ink-receiving layer and at least two colloidal silica layers successively coated onto a support, each of said colloidal silica layers comprising chain colloidal silica as a main ingredient, wherein at least the colloidal silica layer contacting the ink-receiving layer contains no binder and has a coverage of about 1 to 3 g/m$^2$, and the coverage of other colloidal silica layer is about 1 to 6 g/m$^2$.

Especially, by setting the 75 degree specular gloss of the surface of the colloidal silica layers for not less than 10% and not more than about 60%, and the 20 degree specular gloss of the same surface for not more than about 10%, concurrently with incorporating cationic chain colloidal silica into at least the topmost colloidal silica layer, excellent ink jet recording paper can be obtained. An ink jet recording paper with high 75 degree specular gloss can be obtained by calendering the ink-receiving layer before applying the colloidal silica layers that mainly contain chain colloidal silica.

DETAILED DESCRIPTION

The colloidal silica layer of the present invention is the layer that controls the gloss, ink concentration and color reproducability to meet the purpose of the invention. The colloidal silica used in the colloidal silica layers of the present invention has a chain form. The chain includes some limited number of primary particles of spherical silica connected linearly or taking a partially branched form. The size (length) of the chain, as measured by laser-scattering method, preferably ranges from about 40 to about 200 nm.

If the colloidal silica has a size (length) of less than 40 nm, or it does not take a chain form but takes so called "spherical" form, insufficient ink absorbency and slow ink-absorbing speed will be induced, though satisfactory glossy appearance is attained. As a result, blurring (so called "bleed phenomenon") is often seen at the boundary of different colors. Therefore, the coated paper is not suitable for printing with an photo quality ink jet printer, which generally discharges a large quantity of ink during ink injection.

The chain colloidal silica used in the present invention preferably contains primary particles ranging from about 3 to about 40 nm. Primary particles of less than 3 nm are difficult to prepare stably. When the primary particles exceed 40 nm, the specific surface area of the chain colloidal silica is decreased. Accordingly, the ink-capturing ratio of the colloidal silica layer is reduced, causing insufficient color-developing properties, i.e., poor color density and color reproducibility.

The well-known colloidal silica has spherically-shaped particles and has to some extent the ability to form layers by itself. This tendency becomes greater as the diameter of these particles decreases. When a spherical colloidal silica having large diameter particles is used, a binder is necessary to ensure that a layer forms. This reduces the absorptive speed of the colloidal silica layer.

On the other hand, spherical colloidal silica having small particle diameter forms layers well. However, the void volume of the layer of the particles is small, and the ink-absorbing speed is slow. When a chain colloidal silica is applied as in the present invention, colloidal silica chains become moderately entangled as the layer is formed. As a result, it is not necessary to use a binder in order to prevent the detachment of the colloidal silica layer. Further, a moderate void volume can be attained, which is needed when the paper is printed using an ink jet printer that requires a fast ink-absorbing speed.

If the conventional spherical silica is applied to prepare the colloidal layer, the coating liquid penetrates into the ink-receiving layer. Accordingly, when a glossy finish is required, the coverage of the colloidal silica must be increased greatly, which increases cost. Furthermore, the spherical colloidal particles tend to fill the voids of the underlying ink-receiving layer. This causes the ink-absorbing speed to decrease, and bleeding frequently occurs. Therefore, the application of the generally used spherical silica is not preferred for an photo quality ink jet recording paper, which discharges a large quantity of ink in the course of ink injection.

In contrast with this, in case of using the chain colloidal silica of specific size as in the present invention, the penetration of coating solution containing the colloidal silica into the ink-receiving layer is reduced. Accordingly, moderate coverage of the colloidal silica results in satisfactory gloss.

The colloidal silica used in the present invention is advantageously cationic from the viewpoint of dye fixing and water resistance. Accordingly, at least the topmost colloidal silica layer preferably contains cationic chain colloidal silica. Besides, water resistance is one of the essential properties required for ink jet recording papers. Therefore, it is necessary to impart water resistance to the colloidal silica layer. Dye-fixing agents that accomplish this are usually cationic. For that reason, anionic colloidal silica cannot be used.

For these reasons, in the present invention, it is preferable to use cationic chain colloidal silica which exhibits water resistance by itself. However, it may be used together with a dye-fixing agent. It is especially preferable to incorporate cationic colloidal silica at least into the topmost layer for improving water resistance. When the colloidal silica layers are made of only anionic colloidal silica layer, drying speed will be decreased, therefore the ink would penetrate to the other side of the paper.

In order to attain sufficient image color developing properties, it is necessary to increase the thickness of the colloidal silica layer to some extent. However, increasing the coverage will tend to increase the amount of powder that becomes detached from coated paper after drying. Thus, a binder may be incorporated to prevent powder detachment. However, incorporating a binder reduces the ink-absorbing speed, especially at the surface, which causes bleeding. Accordingly, a high-resolution print cannot be obtained. Therefore, it is better not to use a binder if possible.

The term "binder" as used herein is a general term for adhesives generally used together with pigment, dye, auxiliary agent and etc. It plays a part in binding pigments to each other concurrently with bonding the pigments to the surface of the support to intensify the adhesion of coating. This binder generally includes starch, latex, PVA (polyvinyl alcohol), protein and the like.

The colloidal silica used in the present invention exhibits strong autoadhesion and, accordingly, does not require a binder. For this reason, at least the colloidal silica layer contacting the ink-receiving layer contains no binder. Elimination of the binder makes it possible to obtain sufficient ink absorbency even when the thickness of this layer is decreased. Accordingly, the coverage of the first (or bottommost) colloidal silica layer preferably ranges from about 1 to about 3 g/m$^2$. In the present invention, it is necessary to form two or more of colloidal silica layers formed of the required thickness in order to prevent the detachment of the colloidal silica. In this invention, the coverage of every colloidal silica layer except the first layer preferably ranges from about 1 to about 6 g/m$^2$, more preferably, from about 1.5 to about 4 g/m$^2$.

It is possible to incorporate various additives such as dye-fixing agents, sizing agents, anti-foaming agents, color tone-controlling agents and the like into the colloidal silica layers to the extent that these additives do not destroy the effect of the present invention. In this case, it is preferable that the content of the chain colloidal silica in the colloidal silica layer is not less than about 90% by weight If the coverage per unit coating operation is less than about 1 g/m$^2$, some gloss may be obtained by increasing the number of layers. However, this causes insufficient evenness of the coated layers. Further, production costs will increase as the number of layers is increased. On the other hand, when the coverage per unit coating operation is more than about 6 g/m$^2$, powder detachment will be caused. Further, crazes in the coating layer will appear after drying. This causes ink dropped on the surface during printing to flow along the groove of the crazes. Consequently, the printed image will be spoiled. Accordingly, coverages greater than 6 g/m$^2$ are not preferable.

It is preferable that the colloidal silica layer of the present invention has dull-tone. "Dull-tone" is a term, which describes a white glossy appearance that printing coated papers have, and is associated with a delicate and quietly glossy appearance. In order to produce the dull-tone of interest, it is preferable that the 75 degree specular gloss ranges from about 10 to about 60% and, at the same time, that the 20 degree specular gloss is not more than about 10%; and more preferable that the 75 degree specular gloss ranges from about 15 to about 50%, and at the same time, that the 20 degree specular gloss is not more than about 5%. When the 75 degree specular gloss is less than about 10%, so called "dull-tone" glossy appearance cannot be attained. On the contrary, when the 75 degree specular gloss exceeds about 60%, glossy appearance of "gloss-tone" rather than "dull-tone" will be produced. When the 20 degree specular gloss exceeds about 10%, delicate dull-tone glossy appearance cannot be attained.

The glossy appearance can be controlled by the total thickness of the colloidal silica layers and calendering conditions. As the total thickness of the colloidal silica layers increases, or calendering linear pressure rises, the 75 degree specular gloss is heightened. Accordingly, when the calendering linear pressure is heightened until the 75 degree specular gloss exceeds about 60% for the constitution of the present invention, the surface will be densified enough that the ink-absorbing speed is decreased. This causes bleeding.

The support used in the present invention has no particular restriction except that it takes the form of sheet. For example, paper, film of polyethylene, cellophane, polypropylene, polyester, polyvinyl chloride and the like can be used. However, taking costs and environmental problems into consideration, papers, which are cheap and regenerative such as free sheet, art paper, coated paper and etc. are preferable.

The ink-receiving layer formed on the support requires no specific restriction. However, it is preferable that the ink-receiving layer mainly contains a pigment having large specific surface area and high oil absorption, together with a water-soluble or water-dispersible binder. As the pigment, kaolin, calcium carbonate, magnesium oxide, zinc oxide, aluminum silicate, magnesium silicate or the like may be used. In particular, amorphous silica, synthesized amorphous silica or alumina sol is preferably used.

As the water-soluble or water-dispersible binder, for example, water-soluble polymer such as polyvinyl alcohol, casein, starch, gelatin and the like, or water-dispersible polymer such as styrene-butadiene latex, acrylic series of latex, vinyl acetate types of latex and the like can be used.

A hindered amine compound of amino ether type having alkoxyl groups represented by the following formula (1) may be incorporated into the ink-receiving layer of the present invention, in order to impart light resistance to the printed images. Especially, when the hindered amine compound is used together with a benzotriazole compound, the light resistance of images can be improved still more.

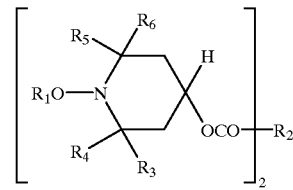

(1)

wherein $R_1$: $C_nH_{2n+1}$, n=1 to 14;

$R_2$: $C_nH_2n$, =1 to 14; and $R_3$ to $R_6$: alkyl or carbonyl group.

In the above formula (1), it is preferable that n in the $R_1$ and $R_2$ is an integer of about 6 to 10. Alkyl or carbonyl group of the $R_3$ to $R_6$ is preferably lower alkyl group has 1 to 4 carbon atoms, and more preferably is a methyl group.

An especially preferable hindered amine compound of amino ether type having alkoxyl groups used in the present invention is bis-(2,2,6,6-tetramethyl-1-(octyloxy)-4-piperidinyl)sebacate (Tinubin 123, trade name of Chiba Specialty Chemicals Co., Ltd.) represented by the formula (1) wherein $R_1$ is $C_8H_{17}$, $R_2$ is $C_8H_{16}$, and $R_3$ to $R_6$ are methyl.

In general, a hindered amine compound reacts with hydroperoxide or triplet oxygen contained in the air to produce a nitroxy radical which further captures a polymer radical generated by photo-deterioration of dye and the like contained in the ink to produce amino ether. Then, this amino ether reacts with a peroxy radical generated by the reaction of the polymer radical with oxygen in the air to produce a nitroxy radical again. Otherwise, the amino ether releases olefin and, at the same time, produces hydroxylamine which will react with the peroxy radical to go back to the nitroxy radical again. It is considered that radicals are captured during the repetition of these cycles to inhibit chain reaction, which results in preventing the photo-deterioration of dye in the ink, namely, the photo-deterioration of images.

The hindered amine compound of amino ether type having alkoxyl groups used in the present invention already has an amino ether group in its molecular structure. Accordingly, peroxy radicals, if produced, can be captured at once. This reaction process is considered to exhibit great effect in preventing the photo-deterioration of images. In contrast with this, conventional alkyl- or acetyl-substituted or unsubstituted hindered amine compounds pose an energy barrier to the production of the amino ether. Accordingly, it is considered that the satisfactory effect for light-stabilizing images has hitherto failed to be attained unlike the case of the present invention.

The content of the hindered amine compound of amino ether type having alkoxyl groups (hereinafter merely referred to as "hindered amine compound") in the ink-receiving layer preferably ranges from about 0.5 to about 15% by weight, especially from about 2 to about 8% by weight. When the content of hindered amine is less than about 0.5% by weight, light resistance is not sufficiently improved. Conversely, when exceeding about 15% by weight, it colors the coating layer.

Preferable benzotriazole compound used in the present invention includes 2-(2-hydroxy-3,5-di-t-amylphenyl)-2H-bebzotriazole, iso-octyl-3,3-(2H-benzotriazole-2-yl)-5-t-butyl-4-hydroxyphenyl propionate, 2-[2-hydroxy-3,5-di)1,1-dimethylbenzyl)phenyl]-2H-benzotriazole, 2-(2'-hydroxy-3'-t-butyl-5'-methylphenyl)-5-chlorobenzotriazole and the like.

The content of the benzotriazole compound in the ink-receiving layer preferably ranges from about 0.5 to about 12% by weight, especially from about 2.5 to about 8% by weight. In the case where the content of the benzotriazole compound is less than about 0.5% by weight, little improvement in light resistance is seen. When the content of the benzotriazole compound exceeds about 12% by weight, it colors the coating layer.

The coverage of the ink-receiving layer is determined properly according to the type of the ink-receiving layer. For instance, in the case of the receiving layer containing much absorptive pigment such as synthetic amorphous silica and the like mainly, the coverage may be little because the volume of voids per unit volume is usually large. However, in the case of the receiving layer containing comparatively less absorptive pigment such as sintered clay and the like, the coverage must be increased because the volume of voids is little. A cationic resin such as polyamine, tertiary or quaternary ammonium salt and the like, dispersants, anti-foaming agents, coloring agents, antistatic agents, sizing agents, surfactants and the like may be incorporated into the ink-receiving layer, if necessary, in amounts that do not spoil the effect of the present invention.

If the ink-receiving layer has a smooth surface, the colloidal silica layer can be coated evenly. Therefore, in the present invention, it is preferable to calender the surface of the ink-receiving layer just after coating. In the present invention, the colloidal silica layer and the ink-receiving layer can be formed by using a variety of coating apparatus such as a blade of various kinds, a roll coater, an air knife coater, a bar coater, a flood coater, a rod blade coater or the like.

Calendering equipment of various kinds can be used to calender the surface of the ink-absorbing or colloidal silica layer. As a calendering equipment for final finishing, an equipment having elastic roll and metallic roll combined therewith such as a supercalendering equipment, a softcalendering equipment or the like is preferably used to prevent causing uneven gloss and crazes. When softcalendering equipment equipped with an elastic roll with a Shore hardness of from about 60 to about 90 is used under linear pressure of from about 50 to about 200 kg/cm, dull-tone gloss can be easily attained without closing off the voids of the colloidal silica layer.

The ink jet recording paper of the present invention includes a chain colloidal silica layer on an ink-absorptive ink-receiving layer. Thereby, the coloration and the roundness of the printed dots (small circles) are superior. In addition, the paper has a delicate and quiet dull-tone gloss. Further, the paper absorbs ink sufficiently even when printed with an photo quality ink jet printer. As a whole, the ink jet paper of the present invention can be regarded as a high quality ink jet recording paper.

EXAMPLES

The present invention will be explained below more concretely in reference to the following examples. However, the present invention should not be construed as being limited to these examples. Unless otherwise noted, all "%" and all "parts" in the examples are by weight.

Example 1

Preparation of Support 85 parts of LBKP having a Canadian standard freeness of 380 ml; 15 parts of NBKP having a Canadian standard freeness of 500 ml; as a loading material, 15 parts of talc, 0.5 parts of commercially available rosin type of sizing agent, 0.3 parts of commercially available cationized starch, 0.5 parts of aluminum sulfate; and 0.1 parts of commercially available paper strength-reinforcing agent were put into water to prepare a 0.8% in solid slurry, and therefrom a support was made using a Foutdrinier paper machine so that basis weight would be controlled at 130 g/m$^2$.

Preparation of Coloring Material for Forming Ink-receiving Layer and their Coating 100 parts of synthetic amorphous silica (Finesil X-37B, trade name, produced by Tokuyama Co., Ltd.), 25 parts of polyvinyl alcohol (PVA117, trade name, produced by Kuraray Co., Ltd.), 10 parts of ethylene/vinyl acetate copolymer emulsion (Sumika Flex 401, trade name, produced by Sumitomo Chemical Co., Ltd.), 5 parts of nonionic SB latex (LX438C, trade name, produced by Nihon Zeon Co., Ltd.), 8 part of dye-fixing agent (PolyFix 700, trade name, produced by Showa Highpolymer Co., Ltd.), 0.2 parts of anti-foaming agent (SN defoamer 480, trade name, produced by Sanopko Co., Ltd.), 3 parts of cationic sizing agent (Polymaron 360, trade name, produced by Arakawa Chemicals Co., Ltd.), 0.005 parts of bluing agent and 0.5 parts of fluorescent were put into water to prepare a coloring material for forming an ink-receiving layer (coating liquid) having a solid content of 20%. This coloring material was coated on the aforementioned support with a bar blade coater so as to adjust the weight after drying at 15 g/m$^2$, followed by drying with a floating dryer till the moisture content in all of the coated layer was decreased to 4.5% to prepare the coated paper (1) having ink-receiving layer thereon.

Coating of Colloidal Silica Layer

A first colloidal silica layer was coated onto the ink-receiving layer of the above coated paper (1) by applying a 20% solids slurry, prepared by putting 100 parts of anionic chain colloidal silica having a particle diameter of 80 nm (SnowTex UP, trade name, produced by Nissan Chemical Industries, Ltd.) and 0.2 parts of anti-foaming agent (KM-72F, trade name, produced by Shin-Etsu Chemical Co., Ltd.) into water. The slurry was coated onto the ink-receiving layer with a bar blade coater so as to control the weight after drying at 2 g/m$^2$. The paper was dried using a floating dryer until the moisture content of the paper was decreased to 4.5%.

Next, a second colloidal silica layer was coated over the first colloidal silica layer by applying a 15% solids slurry, prepared by putting 100 parts of cationic chain colloidal silica having a particle diameter of 90 nm (SnowTex OUP, trade name, produced by Nissan Chemical Industries, Ltd.), 6 parts of dye-fixing agent (PolyFix 700, trade name, produced by Showa Highpolymer Co., Ltd.), 3 parts of cationic sizing agent (Polymaron 360, trade name, produced by Arakawa Chemicals Co., Ltd.) and 0.2 parts of anti-foaming agent (KM-72F, trade name, produced by Shin-Etsu Chemical Co., Ltd.) into water. The coating was applied using a bar blade coater so as to control the weight after drying at 2 g/m$^2$.

Then, on the back surface of the resultant paper, a curl-reducing liquid containing 100 parts of Movinyl 747 and 0.1 parts of calcium stearate (Nobcoat C104H) was coated so as to adjust the weight after drying at 0.5 g/m$^2$. The paper was then dryed until the moisture content was decreased to 4.8%. Thereafter, the surface of the coated paper was subjected to finishing treatment with softcalendering equipment under conditions of a linear pressure of 100 kg/cm. In this way, an ink jet recording paper having a 75 degree specular gloss of 20% was prepared.

Example 2

An ink jet recording paper having a 75 degree specular gloss of 20% was prepared in the same manner as in Example 1 except that both the first and second colloidal silica layers were prepared from a 15% solids slurry, prepared by putting 100 parts of cationic colloidal silica having a particle diameter of 90 nm (SnowTex OUP, trade name, produced by Nissan Chemical Industries, Ltd.), 6 parts of dye-fixing agent (PolyFix 700, trade name, produced by Showa Highpolymer Co., Ltd.), 3 parts of cationic sizing agent (Polymaron 360, trade name, produced by Arakawa Chemicals Co., Ltd.) and 0.2 parts of anti-foaming agent (KM-72F, trade name, produced by Shin-Etsu Chemical Co., Ltd.) into water. Both layers had a coating weight after drying of 2 g/m$^2$.

Example 3

An ink jet recording paper having 75 degree specular gloss of 18% was prepared in the same manner as in Example 1 except that the slurry used for preparing the first colloidal silica layer was replaced by a 15% solids slurry prepared by putting 100 parts of cationic colloidal silica having a particle diameter of 125 nm (SnowTex SO, trade name, produced by Nissan Chemical Industries, Ltd.), 6 parts of dye-fixing agent (PolyFix 700, trade name, produced by Showa Highpolymer Co., Ltd.), 3 parts of cationic sizing agent (Polymaron 360, trade name, produced by Arakawa Chemicals Co., Ltd.) and 0.2 parts of anti-foaming agent (KM-72F, trade name, produced by Shin-Etsu Chemical Co., Ltd.) into water.

Example 4

An ink jet recording paper having a 75 degree specular gloss of 45% was prepared in the same manner as in Example 2 except that the colloidal silica layers were formed after treating the ink-receiving layer with softcalendering equipment under linear pressure of 80 kg/cm previously.

Example 5

An ink jet recording paper having a 75 degree specular gloss of 35% was prepared in the same manner as in Example 4 except that the softcalendering operation was omitted after forming the two colloidal silica layers.

Comparative Example 1

An ink jet recording paper having a 75 degree specular gloss of 23% was prepared in the same manner as in Example 1 except that the SnowTex UP used in preparing the first colloidal silica was replaced by anionic spherical colloidal silica having a particle diameter of 20 nm; and the SnowTex OUP used in preparing the second colloidal silica layer, by cationic spherical colloidal silica having a diameter of 40 nm.

Comparative Example 2

An ink jet recording paper having a 75 degree specular gloss of 20% was prepared in the same manner as in Example 1 except that the colloidal silica used in the first and second colloidal silica layers were replaced by cationic spherical colloidal silica having a particle diameter of 40 nm.

Comparative Example 3

An ink jet recording paper having a 75 degree specular gloss of 15% was prepared in the same manner as in Example 2 except that the secondary colloidal silica layer was omitted.

Comparative Example 4

An ink jet recording paper having a 75 degree specular gloss of 25% was prepared in the same manner as in Comparative Example 3 except that the coverage of the first colloidal silica layer was adjusted to 8 g/m$^2$.

Comparative Example 5

An ink jet recording paper having a 75 degree specular gloss of 22% was prepared in the same manner as in Comparative Example 4 except that 100 parts of anionic chain colloidal silica having a particle diameter of 80 nm (SnowTex UP, trade name, produced by Nissan Chemical Industries, Ltd.) was used as the colloidal silica for preparing the first colloidal silica layer.

Comparative Example 6

An ink jet recording paper having a 75 degree specular gloss of 32% was prepared in the same manner as in Example 2 except that the coverage of the second colloidal silica layer was 8 g/m$^2$.

Comparative Example 7

An ink jet recording paper having a 75 degree specular gloss of 15% was prepared in the same manner as in Example 2 except the coloring material having a solid content of 15%, prepared by putting 100 parts of cationic chain colloidal silica having a particle diameter of 90 nm (SnowTex OUP, trade name, produced by Nissan Chemical Industries, Ltd.), 20 parts of polyvinyl alcohol (PVA117, trade name, produced by Kuraray Co., Ltd.) and 0.2 parts of anti-foaming agent (KM-72F, trade name, produced by Shin-Etsu Chemical Co., Ltd.) into water, was coated so as to control the weight after drying at 2 g/m$^2$ to form the first and second colloidal silica layers.

Comparative Example 8

An ink jet recording paper having a 75 degree specular gloss of 8% was prepared in the same manner as in Example 2 except that the coverage of the first and second colloidal silica layers was controlled at 0.5 g/m$^2$.

Comparative Example 9

No colloidal silica layer was formed on the ink-receiving layer of the coated paper (1) to prepare an ink jet recording paper having a 75 degree specular gloss of 4%.

Comparative Example 10

An ink jet recording paper having a 75 degree specular gloss of 45% was prepared in the same manner as in Comparative Example 6 except that pseudoboehmite alumina sol having a particle diameter of 18 nm (Alumina Sol-520, trade name, produced by Nissan Chemical Industries, Ltd.) was coated and then dried to form a layer in place of the first and second colloidal silica layers.

The formulation of the above examples and comparative examples are shown on the whole in the following Table 1.

Example 6

The ink jet recording paper is obtained in the same manner as in Example 1, except that the coloring material for forming the ink-receiving layer further contains 3 parts of Hindered amine compound: bis-(2,2,6,6-tetramethyl-1-(octyloxy)-4-piperidinyl)sebacate (Tinuvin 123, manufactured by Ciba Specialty Chemicals, Inc.) and 10 parts of Benzotriazole compound: Tinuvin 900 (Ciba Specialty Chemicals Inc.).

TABLE 1

|  | Calendering of ink-receiving layer | first layer colloidal silica | first layer coverage (g/m$^2$) | second layer colloidal silica | second layer coverage (g/m$^2$) | Finishing calendering |
|---|---|---|---|---|---|---|
| Example 1 | na | UP | 2 | OUP | 2 | applied |
| Example 2 | na | OUP | 2 | OUP | 2 | applied |
| Example 3 | na | SO | 2 | OUP | 2 | applied |
| Example 4 | applied | OUP | 2 | OUP | 2 | applied |
| Example 5 | applied | OUP | 2 | OUP | 2 | na |
| Comparative Example 1 | na | N-30G | 2 | N-30G | 2 | applied |
| Comparative Example 2 | na | AK-ZL | 2 | AK-ZL | 2 | applied |
| Comparative Example 3 | na | OUP | 2 | — | — | applied |
| Comparative Example 4 | na | OUP | 8 | — | — | applied |
| Comparative Example 5 | na | UP | 8 | — | — | applied |
| Comparative Example 6 | na | OUP | 2 | OUP | 8 | applied |
| Comparative Example 7 | na | OUP/PVA | 2 | OUP/PVA | 2 | applied |
| Comparative Example 8 | na | OUP | 0.5 | OUP | 0.5 | applied |
| Comparative Example 9 | na | — | — | — | — | — |
| Comparative Example 10 | na | alumina sol | 2 | alumina sol | 2 | applied |

OUP: Chain cationic colloidal silica (particle size of 40 to 100 μm), UP: Chain anionic colloidal silica (particle size of 40 to 100 μm), SO: OUP with larger particle size (particle size of 20 to 130 μm), N-30G: spherical anionic colloidal silica (primary particles of UP or OUP), AK-ZL: spherical cationic colloidal silica (same as those of Tokkai Hei 7-101142), OUP/PVA: mixture of Chain cationic colloidal silica (particle size of 40 to 100 μm) and polyvinyl alcohol.

Various evaluations were attempted of these resultant recording papers. The results obtained are also shown in the following Table 2.

Example 7

The ink jet recording paper is obtained in the same manner as in Example 6, except that the content of the hindered amine compound (Tinuvin 123) is 10 parts in the coloring material for forming ink-receiving layer.

Example 8

The ink jet recording paper is obtained in the same manner as in Example 6 except that the benzotriazole compound is omitted in the coloring material for forming ink-receiving layer.

TABLE 2

|  | 75 degree specular gloss (%) | 20 degree specular gloss (%) | appearance | color development | ink absorbency | roundness | surface strength | craze of coated layer |
|---|---|---|---|---|---|---|---|---|
| Example 1 | 20 | 2 | dull | ○ | ⊙ | ○ | ○ | ○ |
| Example 2 | 22 | 3 | dull | ○ | ⊙ | ○ | ○ | ○ |
| Example 3 | 18 | 2 | dull | ○ | ⊙ | ○ | ○ | ○ |
| Example 4 | 45 | 5 | dull | ○ | ○ | ⊙ | ○ | ○ |
| Example 5 | 35 | 4 | dull | ○ | ⊙ | ⊙ | ○ | ○ |
| Comparative Example 1 | 23 | 3 | dull | Δ | x | ○ | x | ○ |
| Comparative Example 2 | 20 | 2 | dull | Δ | x | ○ | Δ | ○ |
| Comparative Example 3 | 15 | 2 | dull | Δ | x | Δ | Δ | ○ |
| Comparative Example 4 | 25 | 2 | dull | ○ | Δ | Δ | Δ | x |
| Comparative Example 5 | 22 | 3 | dull | ○ | Δ | Δ | x | x |
| Comparative Example 6 | 32 | 4 | dull | ○ | Δ | ○ | Δ | x |
| Comparative Example 7 | 15 | 2 | dull | Δ | x | Δ | ○ | ○ |
| Comparative Example 8 | 8 | 1 | matte | Δ | x | x | ○ | ○ |
| Comparative Example 9 | 4 | 1 | matte | x | ○ | x | ○ | ○ |
| Comparative Example 10 | 45 | 15 | gloss | ○ | Δ | ○ | Δ | ○ |

The evaluation methods of the obtained papers will be explained as follows. In the table, the evaluation rank "◉" or "○" indicates that difficulty will not arise in practical use. In this context, the evaluation rank "Δ" or lower suggests that problems will arise during practical use.

1) Gloss

Specular gloss at 75 degree and 20 degree are measured by using a specular glossimeter produced by Murakami Shikisai Gizyutsu Kenkyusyo K., K. (trade name: GM-26 for 75, GM-26D) in accordance with JIS-P-8142 and JIS-Z-8141.

2) Color-developing Properties

Color-developing properties were evaluated by observing color density, roundness of a printed dot (small circle) and bluring at the boundary due to bleeding.

2-1) Color Density

Using an ink jet printer (PM-750C trade name, a product of Seiko Epson Corp.), solid images of black (BK), cyan (C), magenta (M) and yellow (Y) were printed following the instruction of "Excel", the spreadsheet software sold by Microsoft Corp., after setting the printing quality to a super-fine mode, and the printing paper for a dedicated glossy paper by selection from the setup programs of the printer driver pertaining to the printer. After leaving the printed paper in a thermo-hygrostat room in a day, optical densities of the color images printed were each measured with a Macbeth densitometer (trade name: RD915, produced by Macbeth Inc.). The following average optical density was determined by the average of the four measurements.

Evaluation Criteria:

◉: The average optical density is not less than 1.8.

○: The average optical density is not less than 1.7, but less than 1.8.

Δ: The average optical value is not less than 1.6, but less than 1.7.

×: The average optical density is less than 1.6.

2-2) Roundness

Gray images were formed in the same manner as that for the color images. The shape of a printed dot magnified by 250 times with a microscope was observed visually to evaluate the roundness of the printed dot according to the following criteria. Again, symbols below did not appear correctly on my display.

◉: The contour of the dot shape almost approximates true round.

○: The contour of the dot shape is smooth, and has approximately circular shape.

Δ: The contour of the dot is disordered, and its shape is elliptical rather than circular.

×: The contour of the dot is notched, and the dot does not appear circular.

2-3) Ink Absorbency

Patterns having a boundary between magenta and green solid images were printed, and examined for blur at the boundary (bleed) by visual observation according to the following criteria. The blur at the boundary of magenta and green presents an appearance of black. Accordingly, it is possible to evaluate the ink absorbency very accurately.

◉: No bleeding is observed at all.

○: Bleeding is barely observed.

Δ: Moderate bleeding is observed.

×: Bleeding is markedly observed.

3) Surface Strength

An adhesive tape is applied to the recording side of a recording paper, and rubbed intensely 20 times with a rubber roller. The recording layer is fixed to a spring balance at one end thereof, and the peel strength in the direction of 180° is measured to evaluate the surface strength of the recording paper according to the following criteria:

◉: The peel strength is at least 500 g.

○: The peel strength is not less than 300 g, but less than 500 g.

Δ: The peel strength is not less than 200 g, but less than 300 g.

×: The peel strength is less than 200 g.

4) Craze of Coated Layer

The electron micrograph of the surface of a coated layer magnified by 300 times was observed visually to evaluate the craze of the coated layer according to the following criteria:

◉: No Crazing (crack) is seen.

○: Slight crazing (crack) is seen (1 to 2 particles per field of view).

Δ: Significant crazing (crack) is seen (5 to 10 particles per field of view).

×: Crazing (crack) is seen over the whole surface (more than 10 particles per field of view).

5) Light Resistance

The recorded density of magenta ink is measured after being tested for 25 hours by Xenon Weather Meter SC700-WN (trade name, a product of Suga Test Machinery Limited), and evaluated the remaining recorded density compared with the density before the test according to the ranks mentioned below;

◉: Percentage of remaining recorded density is more than 90%.

○: Percentage of remaining recorded density is 70 to 90%.

Δ: Percentage of remaining recorded density is 50 to 70%.

×: Percentage of remaining recorded density is less than 50%.

As is evident from the results illustrated in Table 2, the ink jet recording paper of the present invention has good ink-absorbency even when printed with photo ink. The chain colloidal silica layer of the specified coverage does not harm the ink absorbency. In addition, the paper exhibits the delicate and quiet appearance of so-called "dull-tone printing paper" both before and after printing. None of the recording papers according to the invention were so glossy as to cause glare. As a result, both text and figures printed on the paper were easy to read. Moreover, the recording paper according to the invention exhibits high color developing properties similar to those of a glossy paper.

It is observed from Examples 6 to 8 that the light resistance is further improved by formulating Tinuvin 123, hindered amine compound of amino ether type having alkoxyl groups of formula (1), in the ink-receiving layer. The light resistance is further improved by formulating benzotriazole compound in the ink-receiving layer.

What is claimed is:

1. An ink jet recording paper comprising a ink-receiving layer and at least two colloidal silica layers successively coated onto a support, each of said colloidal silica layers comprising chain colloidal silica as a main ingredient, wherein at least the colloidal silica layer contacting the ink-receiving layer contains no binder and has a coverage of about 1 to 3 g/m$^2$, and the coverage of other colloidal silica layer is about 1 to 6 g/m$^2$.

2. An ink jet recording paper as in claim 1, wherein said paper has a 75 degree specular gloss of about 10 to 60% and a 20 degree specular gloss of less than about 10% at the surface.

3. An ink jet recording paper as in claim 2, wherein the chain colloidal silica in at least the topmost of said colloidal silica layers is cationic.

4. An ink jet recording paper as in claim 3, wherein said ink-receiving layer is calendered before said colloidal silica layers is applied.

5. An ink jet recording paper as in claim 3, wherein said ink-receiving layer comprises a hindered amine compound of amino ether type having alkoxyl groups represented by the following formula:

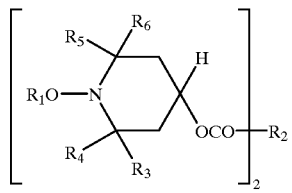

wherein $R_1$: $C_nH_{2n+1}$, n=1 to 14;

$R_2$: $C_nH_{2n}$, n=1 to 14; and $R_3$ to $R_6$: alkyl or carbonyl group.

6. An ink jet recording paper as in claim 5, wherein said ink-receiving layer further comprises a benzotriazole compound.

7. An ink jet recording paper as in claim 2, wherein said ink-receiving layer is calendered before said colloidal silica layers is applied.

8. An ink jet recording paper as in claim 2, wherein said ink-receiving layer comprises a hindered amine compound of amino ether type having alkoxyl groups represented by the following formula:

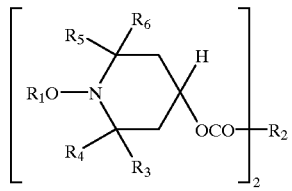

wherein $R_1$: $C_nH_{2n+1}$, n=1 to 14;

$R_2$: $C_nH_{2n}$, n=1 to 14; and $R_3$ to $R_6$: alkyl or carbonyl group.

9. An ink jet recording paper as in claim 8, wherein said ink-receiving layer further comprises a benzotriazole compound.

10. An ink jet recording paper as in claim 1, wherein the chain colloidal silica in at least the topmost of said colloidal silica layers is cationic.

11. An ink jet recording paper as in claim 10, wherein said ink-receiving layer is calendered before said colloidal silica layers is applied.

12. An ink jet recording paper as in claim 10, wherein said ink-receiving layer comprises a hindered amine compound of amino ether type having alkoxyl groups represented by the following formula:

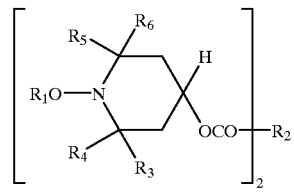

wherein $R_1$: $C_nH_{2n+1}$, n=1 to 14;

$R_2$: $C_nH_{2n}$, n=1 to 14; and $R_3$ to $R_6$: alkyl or carbonyl group.

13. An ink jet recording paper as in claim 12, wherein said ink-receiving layer further comprises a benzotriazole compound.

14. An ink jet recording paper as in claim 1, wherein said ink-receiving layer is calendered before said colloidal silica layers is applied.

15. An ink jet recording paper as in claim 1, wherein said ink-receiving layer comprises a hindered amine compound of amino ether type having alkoxyl groups of formula below:

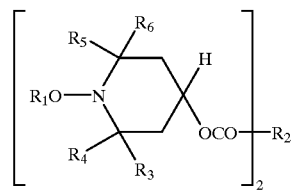

wherein $R_1$ is $C_nH_{2n+1}$ (n=1 to 14), $R_2$ is $C_nH_{2n}$ (n=1 to 14), and $R_3$ to $R_6$ are alkyl or carbonyl groups.

16. An ink jet recording paper as in claim 15, wherein said ink-receiving layer further comprises a benzotriazole compound.

17. A process for preparing an ink jet recording paper comprising applying an ink-receiving layer to a support, calendering the ink-receiving layer and then applying at least two colloidal silica layers, wherein each of said colloidal silica layers comprise chain colloidal silica as the main ingredient, and at least the colloidal silica layer contacting the ink-receiving layer contains no binder.

* * * * *